United States Patent [19]

Konig

[11] 4,258,347

[45] Mar. 24, 1981

[54] MAGNET COIL

[75] Inventor: Ferdinand Konig, Seuzach, Switzerland

[73] Assignee: Sulzer Brothers Limited, Winterthur, Switzerland

[21] Appl. No.: 968,691

[22] Filed: Dec. 12, 1978

[30] Foreign Application Priority Data

Dec. 15, 1977 [CH] Switzerland ........................ 15436/77

[51] Int. Cl.[3] .................................................. A01F 5/00

[52] U.S. Cl. ................................ 335/282; 174/122 G; 336/96

[58] Field of Search .................. 336/96, 205; 335/278, 335/282; 174/110 R, 119 C, 121 A, 122 G, 126 C, 126 CP

[56] References Cited

U.S. PATENT DOCUMENTS

| | | | |
|---|---|---|---|
| 2,941,905 | 6/1960 | Hofman | 336/96 X |
| 2,943,169 | 6/1960 | Rice | 174/14 R X |
| 3,211,695 | 10/1965 | Peterson | 336/96 X |
| 3,308,414 | 3/1967 | Ostrander et al. | 336/96 X |
| 3,389,458 | 6/1968 | Ostrander et al. | 336/205 X |

*Primary Examiner*—George Harris
*Attorney, Agent, or Firm*—Kenyon and Kenyon

[57] ABSTRACT

The magnet coil uses copper in the form of powder or metal chips and in bags of quartz glass fabric to bind-in any oxygen or water leaking into the enclosure in which the copper winding is located. The copper powder or chips act as absorbing medium to prevent corrosion of the copper winding.

13 Claims, 1 Drawing Figure

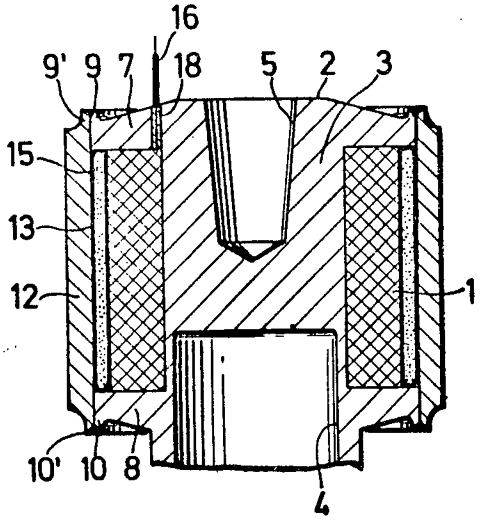
16
9'
9
7
18
5
2
3
15
13
12
1
10'
10
8
4

MAGNET COIL

This invention relates to a magnet coil for use at high operating temperatures.

As is known, magnet coils have been constructed with at least one winding of copper wire, which is enclosed in a temperature-resistant, preferably metallic, enclosure and with at least one completely tight feedthrough for a coil lead through the enclosure. It is also known that, at normal room temperature, the oxidation of copper leads to a relatively dense oxide layer which causes the oxidation rate to approach a limit asymptotically. However, at temperatures around 400° C., this is no longer the case. The oxide formed is porous and the corrosion rate therefore does not decline. This phenomenon can have an adverse effect in coils which are operated at a high temperature, for instance, in coils of magnetic valves. It has therefore been proposed to fill the metal enclosures of such coils with a protective gas.

However, it has been found that it is hardly possible to make such coil enclosures completely gastight. The danger therefore exists that, in the course of time, especially if the high temperatures act continuously, the protective gas diffuses out of the enclosure and oxygen diffuses into the enclosure, so that considerable corrosion must be expected.

Accordingly, it is an object of the invention to reduce the risk of copper oxidation in magnet coils.

It is another object of the invention to provide a magnet coil that can be used at high operating temperatures.

It is another object of the invention to provide a magnet coil which can be relatively easily constructed for use at high operating temperatures without corroding.

Briefly, this invention provides a magnet coil for high operating temperatures of 400° C. and higher which is constructed of a temperature-resistant enclosure, at least one gas-tight feedthrough in the enclosure, and a winding of copper wire enclosed in the enclosure with a lead extending through the feedthrough. In addition, a substance is provided in the enclosure for binding-in oxygen leaking into the enclosure.

If a small leak occurs in the enclosure, the penetrating oxygen or at least the major part of the oxygen, is adsorbed or absorbed by the oxygen-binding substance, so that the conductor copper is oxidized to a considerably smaller extent. Copper which is especially advantageous oxygen-binding substance is added to the coil in the form of powder or fine chips with a large specific surface, and preferably packed in a bag of quartz glass fabric.

In addition, it is advantageous to plate the copper wire of the coil with a nickel layer which holds off the oxygen attack or at least considerably delays such an attack. A quartz glass fabric is advantageously used for insulating the copper wire of the coil. The oxygen-binding substance added to the winding is advantageously packed in one or more bags of quartz glass fabric which can withstand the temperatures mentioned.

In addition, the coil can be filled up with a temperature-resistant mass, preferably ceramic.

These and other objects and advantages of the invention will become more apparent from the following detailed description and appended claims taken in conjunction with the accompanying drawing in which:

The drawing illustrates a cross-sectional view of a magnet coil according to the invention.

Referring to the drawing, the magnet coil has a winding 1 of quartz glass-insulated copper wire mounted on a ferromagnetic core 2 about a central part 3 which has a large bore hole 4 at the bottom for receiving an armature (not shown) which can slide in the axial direction. The core 2 also has a relief cut 5 at the top, as viewed, for weight reduction. Two flanges 7, 8 are disposed on the central part 3 and each has an axially projecting lip 9, 10, at the circumference. Together with the central part 3 of the core, the flanges 7 and 8 form the coil form and, at the same time, part of an enclosure which is closed off by a section of tubing 12 with lips 9' and 10' at the end faces. These lips 9', 10' are welded in gastight manner to the lips 9, 10. In the space between the winding 1 and the tube section 12, a substance such as copper powder 15 in bags 13 of quartz glass fabric is enclosed in the enclosure for binding-in oxygen and/or water leaking into the enclosure formed by the core 2, and the tubing 12.

A lead 16 of the winding 1 passes through the flange 7 in a highly gastight feed through 18 (not shown in detail), such as are commercially available. The end of the winding 1 is metallically connected to the mass of the core in a suitable manner (not shown).

The bags 13 prevent direct contact of the copper powder with the coil; at the same time; the bags 13 prevent the copper powder from forming a closed electrically conducting circuit around the coil.

It may be advantageous to fill the winding 1 up with a ceramic casting compound before the bags 13 are put in place. This casting compound has the advantage that the turns of the winding are immovably fixed, that the initial amount of oxygen contained in the space of the winding is small after the gastight closing of the enclosure and that the oxygen supply to the winding 1 is choked off in case a leak occurs in operation.

A substance for binding in water is e.g. silica gel.

What is claimed is:

1. A magnet coil for high operating temperatures of 400° C. and higher comprising a temperature-resistant enclosure;

at least one gas-tight feedthrough in said enclosure;

a winding of copper wire enclosed in said enclosure and having a lead extending through said feedthrough; and a substance in said enclosure for binding in oxygen leaking into said enclosure.

2. A magnet coil as set forth in claim 1 wherein said substance essentially contains copper.

3. A magnet coil as set forth in claim 1 wherein said substance is in the form of metal chips.

4. A magnet coil as set forth in claim 1 wherein said substance is in the form of a powder.

5. A magnet coil as set forth in claim 1 which further comprises a bag of quartz glass fabric having said substance packed therein.

6. A magnet coil as set forth in claim 1 wherein said copper wire is nickel-plated.

7. A magnet coil as set forth in claim 1 wherein said copper wire is insulated with quartz glass fibers.

8. A magnet coil as set forth in claim 1 which further comprises a ceramic casting compound filling at least said winding.

9. A magnet coil as set forth in claim 1 wherein said substance has an absorbing effect and is in the form of one of metal chips and powder.

10. A magnet coil as set forth in claim 9 wherein said substance is copper.

11. A magnet coil as set forth in claim 10 wherein said wire is nickel-plated and insulated with quartz glass fibers.

12. A magnet coil for high operating temperatures of 400° C. and higher comprising a temperature-resistant enclosure;

at least one gas-tight feedthrough in said enclosure;

a winding of copper wire enclosed in said enclosure and having a lead extending through said feedthrough; and a bag of quartz glass fabric in said enclosure having a copper substance therein for binding-in oxygen and water leaking into said enclosure.

13. A magnet coil as set forth in claim 12 which further comprises a ceramic casting compound in said enclosure filling at least said windings.

* * * * *